(12) United States Patent
Thole et al.

(10) Patent No.: US 10,179,345 B2
(45) Date of Patent: Jan. 15, 2019

(54) METHOD FOR PRODUCING AN AT LEAST TWO-LAYERED BOARD, AND AN AT LEAST TWO-LAYERED BOARD

(71) Applicant: FRAUNHOFER-GESELLSCHAFT ZUR FÖRDERUNG DER ANGEWANDTEN FORSCHUNG E.V., München (DE)

(72) Inventors: Volker Thole, Braunschweig (DE); Arne Schirp, Braunschweig (DE); Rainer Henniger, Schelkligen (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 0 days.

(21) Appl. No.: 14/772,280

(22) PCT Filed: Mar. 3, 2014

(86) PCT No.: PCT/EP2014/000535
§ 371 (c)(1),
(2) Date: Sep. 2, 2015

(87) PCT Pub. No.: WO2014/135260
PCT Pub. Date: Sep. 12, 2014

(65) Prior Publication Data
US 2016/0001323 A1    Jan. 7, 2016

(30) Foreign Application Priority Data
Mar. 7, 2013   (DE) ................... 10 2013 003 947

(51) Int. Cl.
*B05D 7/00* (2006.01)
*B32B 5/16* (2006.01)
(Continued)

(52) U.S. Cl.
CPC ............... *B05D 7/52* (2013.01); *B05D 3/007* (2013.01); *B32B 5/16* (2013.01); *B32B 5/22* (2013.01);
(Continued)

(58) Field of Classification Search
None
See application file for complete search history.

(56) References Cited

U.S. PATENT DOCUMENTS

2007/0298199 A1* 12/2007 Lawson ................... B27N 3/04
428/35.6
2010/0055420 A1    3/2010 Vermeulen
(Continued)

FOREIGN PATENT DOCUMENTS

DE    10 2006 027 982 B3    12/2007
DE      102006027982 B3    12/2007
(Continued)

OTHER PUBLICATIONS

Machine Translation of EP 1847385 A1.*
International Search Report, issued in PCT/EP2014/000535, dated Sep. 16, 2014.

*Primary Examiner* — Shamin Ahmed
*Assistant Examiner* — Bradford M Gates
(74) *Attorney, Agent, or Firm* — Birch, Stewart, Kolasch & Birch, LLP

(57) ABSTRACT

The invention relates to a method for producing an at least two-layered board. The board has a carrier layer, which consists at least partly of wood or lignocellulose-containing particles or fibers, and at least one coating, which consists of a WPC material and which is arranged on at least one face of the carrier layer. The method has the following steps: providing a finished carrier board (30) which forms the carrier layer; providing a WPC coating material, for example in the form of a granulate (32), on at least one of the two
(Continued)

surfaces of the carrier board (30); and pressing the WPC coating material and the carrier board (30) under the influence of heat and pressure.

17 Claims, 11 Drawing Sheets

(51) Int. Cl.

| | | |
|---|---|---|
| *B32B 5/22* | (2006.01) | |
| *B32B 5/26* | (2006.01) | |
| *B32B 5/28* | (2006.01) | |
| *B32B 7/12* | (2006.01) | |
| *B32B 21/02* | (2006.01) | |
| *B32B 21/04* | (2006.01) | |
| *B32B 21/08* | (2006.01) | |
| *B32B 21/10* | (2006.01) | |
| *B32B 27/04* | (2006.01) | |
| *B32B 27/12* | (2006.01) | |
| *B32B 27/28* | (2006.01) | |
| *B32B 27/42* | (2006.01) | |
| *E04C 2/24* | (2006.01) | |
| *B05D 3/00* | (2006.01) | |
| *E04F 13/16* | (2006.01) | |
| *E04F 15/10* | (2006.01) | |

(52) U.S. Cl.
CPC .................. *B32B 5/26* (2013.01); *B32B 5/28* (2013.01); *B32B 7/12* (2013.01); *B32B 21/02* (2013.01); *B32B 21/042* (2013.01); *B32B 21/08* (2013.01); *B32B 21/10* (2013.01); *B32B 27/04* (2013.01); *B32B 27/12* (2013.01); *B32B 27/28* (2013.01); *B32B 27/42* (2013.01); *E04C 2/246* (2013.01); *E04F 13/16* (2013.01); *E04F 15/102* (2013.01); *E04F 15/107* (2013.01)

(56) References Cited

U.S. PATENT DOCUMENTS

| | | | |
|---|---|---|---|
| 2011/0300392 A1 | 12/2011 | Vermeulen | |
| 2013/0011684 A1* | 1/2013 | Jensen | B44C 5/04 |
| | | | 428/447 |
| 2013/0273244 A1* | 10/2013 | Vetter | E04B 1/00 |
| | | | 427/201 |

FOREIGN PATENT DOCUMENTS

| | | |
|---|---|---|
| DE | 202009000448 U1 | 3/2009 |
| DE | 20 2009 000 448 U1 | 4/2009 |
| DE | 10 2011 004 717 A1 | 8/2012 |
| EP | 1 584 669 A1 | 10/2005 |
| EP | 1 847 385 B1 | 10/2007 |
| EP | 1847385 A1 | 10/2007 |
| EP | 1 743 005 B1 | 5/2008 |
| WO | WO 2007/144403 A1 | 12/2007 |
| WO | WO 2008/122668 A1 | 10/2008 |
| WO | WO 2010/081860 A1 | 7/2010 |
| WO | WO 2012/113913 A1 | 8/2012 |

* cited by examiner

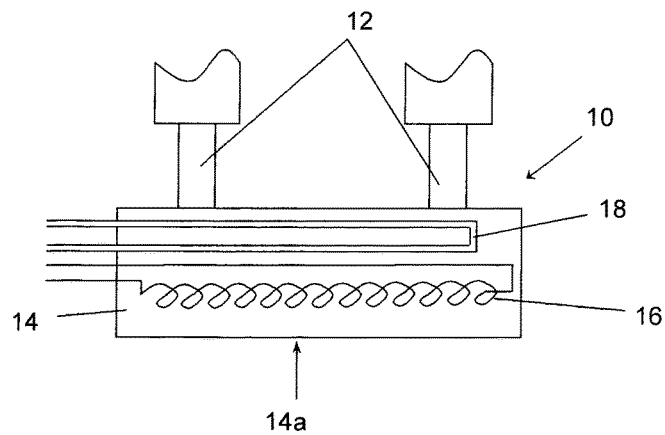
Fig. 1
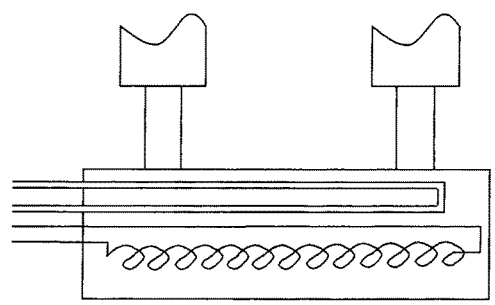
Fig. 2
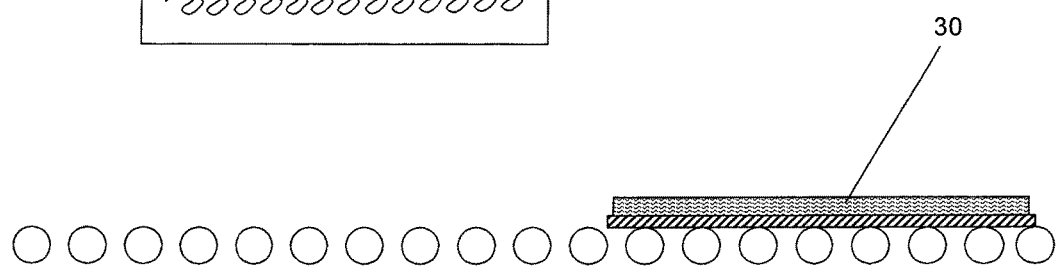

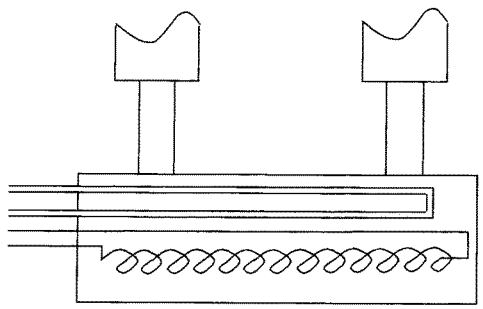
Fig. 9
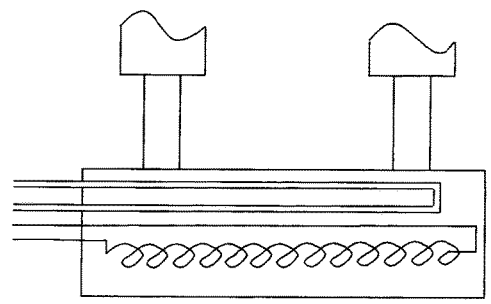
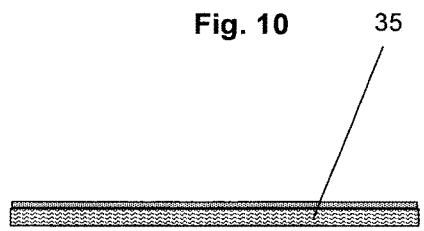
Fig. 10   35
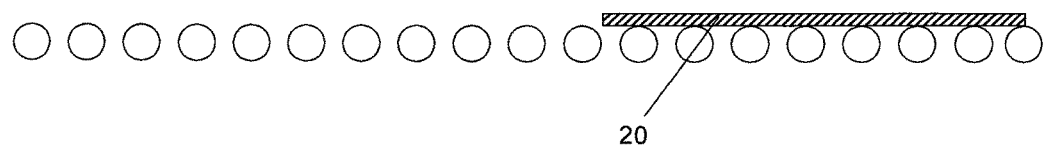
20

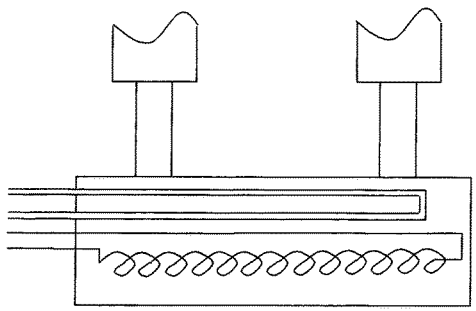
Fig. 13
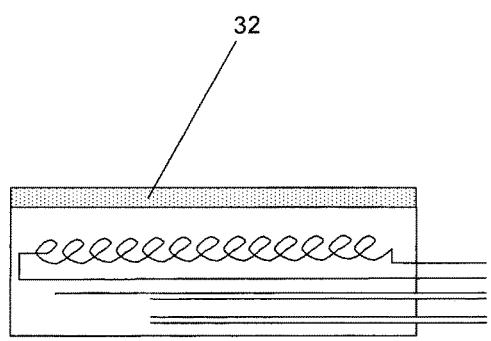
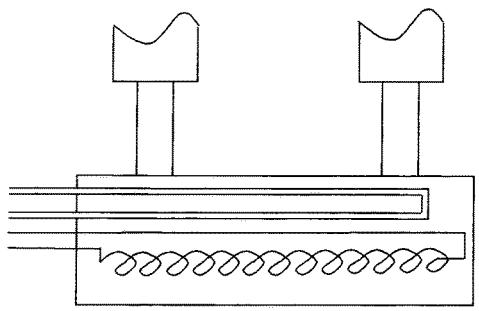
Fig. 14
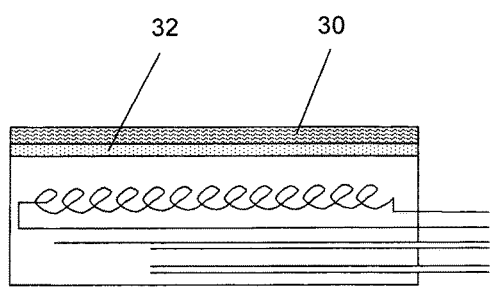

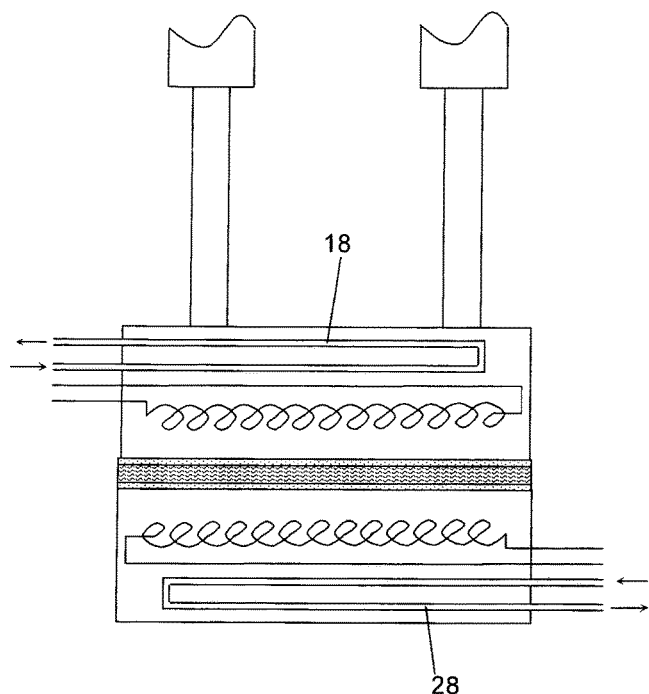
Fig. 19
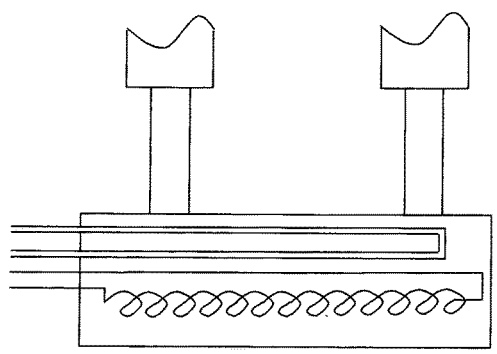
Fig. 20
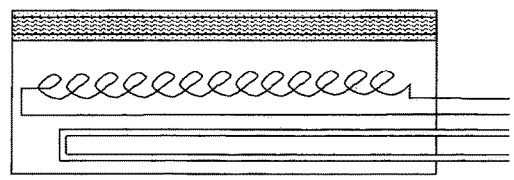

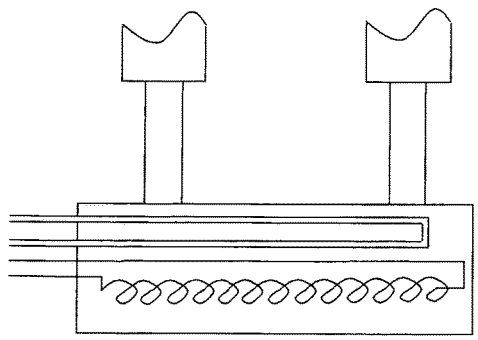
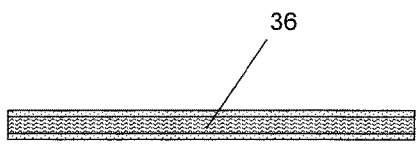
Fig. 21

METHOD FOR PRODUCING AN AT LEAST TWO-LAYERED BOARD, AND AN AT LEAST TWO-LAYERED BOARD

TECHNICAL FIELD OF THE INVENTION

The invention relates to a method for producing an at least two-layer board and to an at least two-layer board.

TECHNICAL BACKGROUND AND PRIOR ART

Carrier boards made of wood or wood-based materials are widely used in furniture making and the building and construction industry. Depending on the dimensions of the wood parts, distinctions are drawn between layered materials, chip materials and fibrous materials. The mechanical properties can be adjusted to great extents in a targeted manner by varying material and process parameters. Dominant influencing parameters are the dimensions of the wood parts, the bulk density of the material, the binder content and the structure of the material perpendicularly to the board plane and in the board plane. For example, in the case of light insulating boards, the flexural strength thereof may be just 1 N/mm$^2$, yet materials with a flexural strength of much greater than 100 N/mm$^2$ can also be produced from the same type of wood having laminated wood parts as the structural elements. In addition to the mechanical properties, in particular the hygric properties also determine the usage possibilities. Materials having binders which are hydrolytically less stable are not suitable for exterior use and in construction elements in which there is a risk of high levels of dampness. For load bearing usages, there are strict regulations regarding the moisture resistance of the materials. The wood components, however, cannot be protected against hygric swelling and shrinkage even by using moisture-resistant binders. The stresses associated with the hygric length changes can be greater than the maximum adhesive tensions between the binder component and the wood component. These relationships result in the delaminations that can often be seen in wood-based materials that are used outside, e.g. as cladding. To prevent these undesirable weathering effects, the materials are coated, varnish typically being applied thereto. A coat of varnish, however, only has a temporary effect. When the varnish layer thickness is very low, unavoidable hygric length changes lead to small cracks, through which water can infiltrate the material. This leads to the varnish separating from the material and to increasing weather damage to the wood-based-material boards.

Although longer lasting coatings made of melamine papers or phenol papers are possible, these are only rarely used, since they cover wood structure. Moreover, these coatings are very brittle. Mechanical loads thus also easily lead to cracks, leading to the same consequences as known with varnish coatings. Crack formation in the region of fastening elements have to be dealt with particularly frequently. With screw heads or nail heads and with nuts, star-shaped cracks, which are initially invisible but become clearly visible in the event of water ingress, form as a result of excessive local stresses. In addition to an aesthetic defect, this also constitutes a technical defect in the longer term.

Some wood-based materials, such as oriented strand board (OSB), consist of relatively large laminated wood parts as functional structure elements (FSE). Owing to the plywood-type design perpendicularly to the board plane and the high mechanical properties, these materials are a preferred construction material. Materials for use in construction have to comply with the legal requirements. For example, the requirements of OSB are controlled by standards, four material classes being defined in EN 300. As the numbers get higher from OSB 1 to OSB 4, the requirements increase, in particular on moisture resistance. OSB 3 is in particular demand and is produced on an industrial scale. The production of OSB 1 is insignificant; OSB 2 and OSB 4 together make up just 20 to 30% of the production volume.

In all wood-based materials, the bulk density is one of the decisive factors in terms of the hygric and mechanical properties. As the density increases, so too do the resilient characteristics (elastic modulus) and the mechanical properties (flexural strength, tensile strength). Also, the amount and type of adhesive are reflected in the mechanical properties. Even with a correspondingly high bulk density, insufficient adhesion manifests itself in low transverse tensile strengths. In OSB, the required amounts of adhesive are approximately the same as in typical chipboards, despite the significantly lower particle surface. A large number of tests further prove the high dependency of flexural strength and bending elastic modulus on the strand length, the ratio of the strand length to the strand thickness (lengthwise degree of slenderness) in fact being more important than the strand length. Significant increases in strength can be achieved up to degrees of slenderness of 200. Therefore, the focus is not on strand thickness during production of OSB either, but rather on the degree of slenderness. Often, the materials contain strands having a thickness of significantly greater than 0.5 mm. Thicker strands cannot sufficiently plasticise even during hot-pressing, and so the surface contact between the individual strands or veneer strips is not comparable to that of plywood. Moreover, the adhesive is not applied to the strands across the whole surface, but rather in a punctiform manner. If these materials are exposed to direct weathering, the result is clearly visible delaminations in the cover layer within a time period that is relatively short for construction materials. Strands can be separated from the surface of the board without using force or can be pulled off using slight peeling stress. Delaminations can occur even in the absence of weathering if the amount of adhesive is insufficient. Since the distribution of adhesive follows statistical laws, relatively high amounts of adhesive are used to largely prevent such delaminations.

The comparably high requirements for adhesive are also due to the pore structure which is inevitably produced in the case of relatively thick and thus insufficiently plasticised strands or veneer strips. In the event of tensile stress and unfavourable pore structure, the adhesive joints are subject to peeling—a very disadvantageous type of stress for a bonded joint.

Pore space and board bulk density are in approximately linear correlation up to a bulk density of approximately 10% over the bulk density of the wood. Above this range, the inter-particle pore space does not decrease by the same amount as the board bulk density increases—an effect which is influenced, inter alia, by the strand geometry, strand thickness, wood type, plasticisation during hot-pressing, and strand moisture prior to the hot-pressing. For commercial and technical reasons (practical board bulk density, strand thickness variations), in industrial conditions a certain pore space will always remain in the wood-based materials consisting of strands and veneer strips.

For specific applications, materials having a high elastic modulus are also required in furniture making. Materials having strands and veneer strips would, for example, be very suitable materials for furniture. For visual and usage reasons, furniture materials need to be coated. The most widely used coatings are melamine papers, films and laminates, which are applied by means of a pressing operation with or without the application of adhesive. Although it is possible to apply these coating materials to the material surfaces, as a result of the coating the pores that are also present in the surface begin to show, or the coating is pushed into the pores. Previous approaches to solving this problem by applying several coating layers, by priming or by laminates were successful in technical terms but were not economical. There is thus the need for a furniture material which can be coated and has a high elastic modulus.

If the delaminations could be prevented, the strand and veneer strip materials would also be well suited as a construction material in regions exposed to high amounts of moisture. Protection against delaminations could be achieved by means of coatings. In this way, press coatings such as melamine papers and phenol papers can prevent water ingress effectively. The pore space near the surface, however, is not completely filled by these coatings, but rather is merely covered in a sheet-like manner. These regions constitute weak points to mechanical damage, and therefore only the very expensive multi-layer press coatings or laminates ensure long-lasting protection. Aside from a few usage areas, for example formwork boards, press coatings on strand and veneer strip materials could not become widely accepted.

In addition to the less favourable press coatings (melamine papers, films), varnishes are also conceivable as coatings. Since deep surface pores are also disadvantageous for varnish coatings and additionally it is not possible to produce a covering coating using the typical application amounts owing to the pore structure, ingress of water by capillary action and sorption cannot be avoided with a varnish coating either.

Therefore, for applications in both furniture and construction, there is a need for effective coating materials made of strands and veneer strips which fill pores, repel water, are long-lasting and are less susceptible to cracks.

In addition, wood polymer composites (WPC) are known. These WPCs based on polyolefins and other thermoplastically workable plastics materials are becoming increasingly established in the German and European markets. They are largely used outside. Typical uses are decking coverings and façade cladding. The aim is for their potential uses to be expanded, though this is greatly restricted at the moment by a number of features, including the low surface energy thereof, which makes bonding or coating significantly more difficult. Components made of WPC are described, for example, in DE 10 2006 027 982 B3 and DE 20 2009 448 U1, with DE 20 2009 448 U1 describing an extrusion method and DE 10 2006 027 982 B3 describing an injection moulding method for producing the respective components.

The generic document, EP 1 847 385 A1, proposes a multi-layer board consisting of a core and cover layers arranged on the top side and bottom side of the core. In particular, it is proposed that the cover layers consist of WPC and the core is an OSB board. A method is disclosed for the production of a multi-layer board. First, a layer of WPC granular material is strewed on, onto which a layer of OSB strands is strewed. A layer of WPC granular material is strewed onto this layer. The three layers are then jointly pressed together under the effect of heat and pressure.

However, this method has been shown to be unworkable in practice because the granular material strewed onto the upper cover layer runs into the loose mat and is thus not fixed onto the strands, does not bring about complete covering, and leads to an asymmetrical board structure. An asymmetrical board structure causes the boards to become warped, as a result of which they become unusable.

SUMMARY OF THE INVENTION

On this basis, the problem addressed by the present invention is to provide an effective method by which an at least two-layer board can be produced to have both a carrier layer consisting at least in part of wood parts, wood particles or wood fibres and a cover layer consisting of a WPC material.

This problem is solved by a method having the features of claim 1.

In the method according to the invention, a finished carrier board (wood-based-material board such as OSB, LSL or multi-layer solid wood) is first produced, and this forms the carrier layer. This finished board is pressed together with a WPC coating material, in particular WPC granular material, under the effect of heat and pressure so that during pressing said WPC coating material is both shaped into the cover layer and is integrally bonded to the carrier board. It has been shown that, in spite of the aforementioned properties of WPC, a sufficient integral bond to the carrier board can be formed, in particular when the carrier board has pores. The use of alternative board types (e.g. chipboard, solid wood board) for WPC press coating is also possible. These alternative boards can also have a relatively low bulk density (less than 500 kg/m$^3$). To improve the, adhesion of the coating to the carrier board, it may be advantageous to use adhesion promoters, which can consist of either the adhesion promoters typically used in WPC production or the adhesives used to produce the carrier boards. Since, in particular in light boards, there is also the risk of the granular materials trickling in, it has proven advantageous to place a thermoplastic film between the granular material and carrier board, which film melts when heat is applied during hot-pressing and forms a rigid bond to the carrier board and the granular material. It is also possible to use thermoplastic films to prevent the materials from trickling through during the initial process. The advantage of a WPC coating which fills the pores also makes it possible to apply thermosetting press coating materials or veneers. This can take place either together with the WPC coating or in another pressing process once the WPC coating has been applied.

The invention will now be explained in more detail on the basis of embodiments in relation to the drawings, in which:

BRIEF DESCRIPTION OF THE FIGURES

FIG. 1 is a highly schematic view of a device for producing a two-layer board according to the invention, FIGS. 2 to 10 show the production of a two-layer board by means of the device shown in FIG. 1, FIGS. 12 to 21 show the production steps for producing a three-layer board according to the invention using the device shown in FIG. 11.

DESCRIPTION OF PREFERRED EMBODIMENTS

Figure 3:
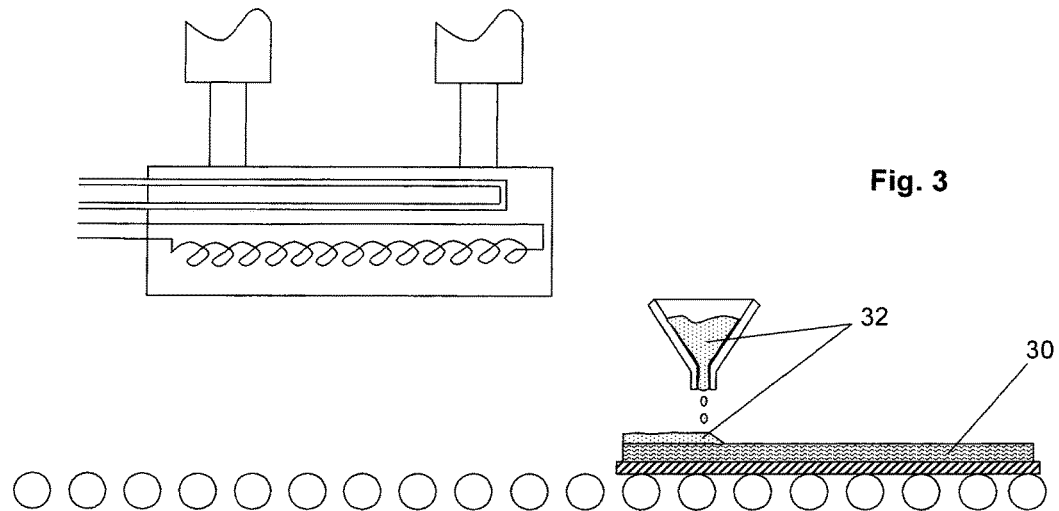

FIG. 1 is a highly schematic view of a device for producing a two-layer board according to the invention. This device consists substantially of two parts, i.e. a press 10, the press element 14 of which can be moved in the Z-direction by means of piston-cylinder units 12, and a preferably rectangular press plate 20, which can be moved relative to the press in a horizontal direction, i.e. the X-direction.

The first press element 14 has a downward facing application surface 14a which is generally flat and generally substantially the same size as or smaller than the press plate. The press element 14 comprises a (preferably electrical) heating system 16 and a cooling system 18, which is preferably designed as a water cooling system. In FIG. 1, as with all the drawings, this is only shown schematically.

In a first method step, as shown in FIG. 2, a carrier board 30, which can in particular be a wood-based-material board, a multi-layer solid wood board or a solid wood board, is placed onto the press plate 20. If a wood-based-material board is used as the carrier board 20, an OSB board is particularly preferable.

Figure 4:
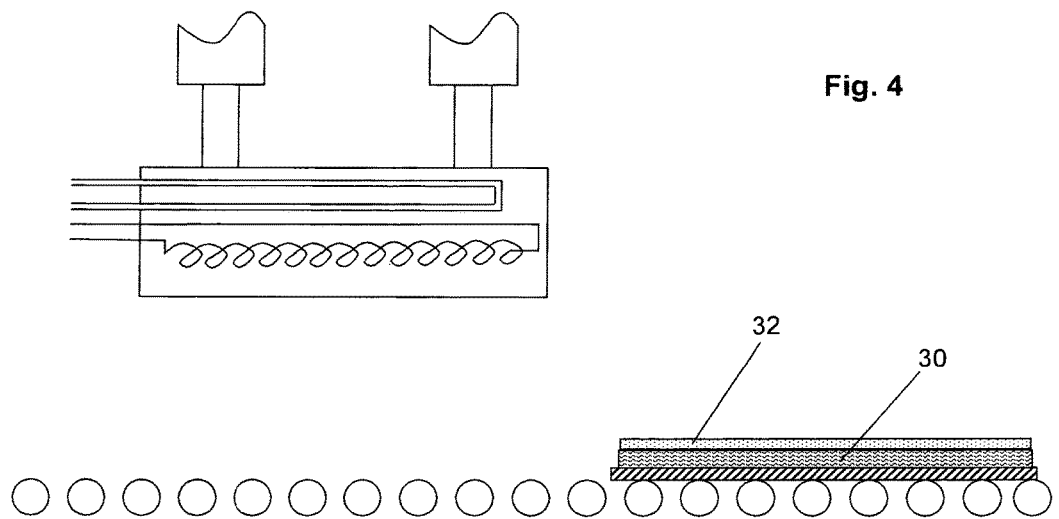

In the next method step, as shown in FIG. 3, a WPC coating material is applied to the upward facing surface of the carrier board 30. In the embodiment shown, this WPC coating material is in the form of WPC granular material 32, which is strewed or poured onto the upward facing surface of the carrier board 30. The application is preferably carried out such that as uniform a layer as possible of WPC granular material 32 covers the entire upward facing surface of the carrier board 30 (FIG. 4).

Figure 5:
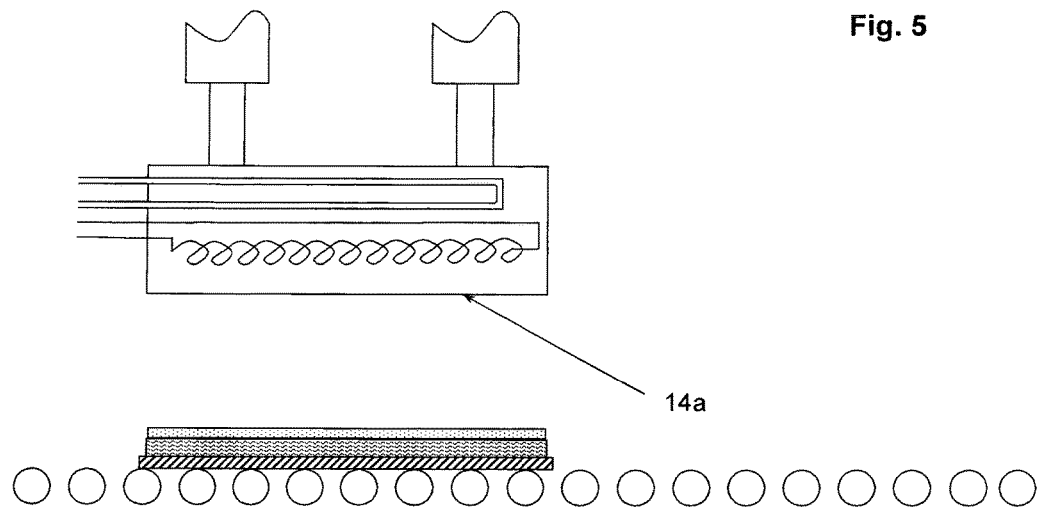
Figure 6:
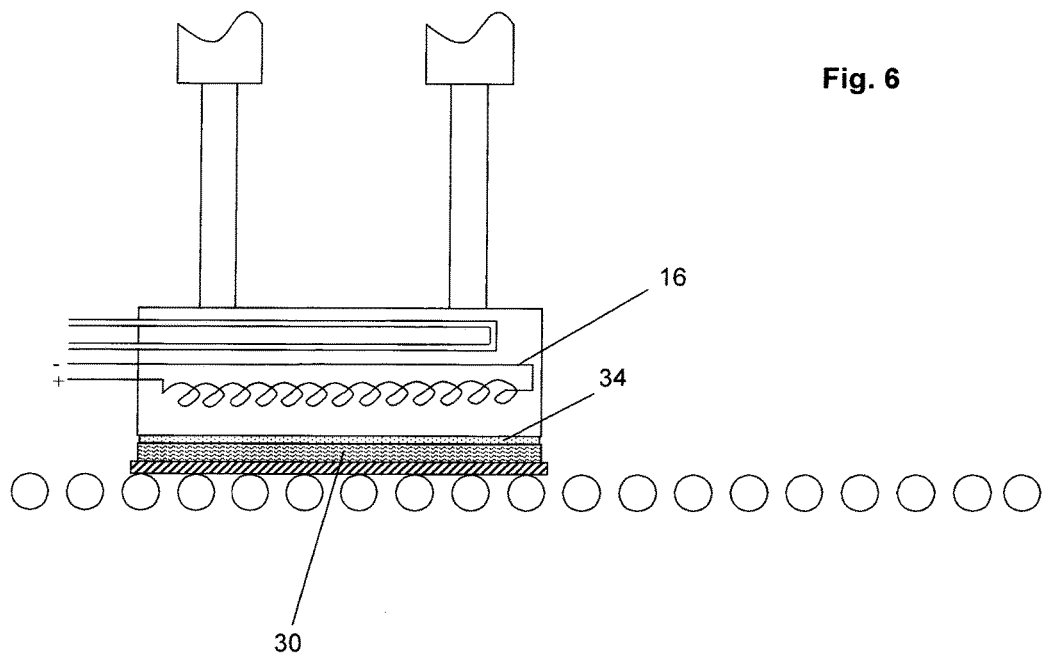

In the following method step shown in FIG. 5, the press plate 20 is moved below the first press element 14. After this, in the next method step the press element 14 is lowered by means of the piston-cylinder units 12 such that the WPC granular material 32 is pressed to the carrier board in such a way that a rigid WPC layer 34 is produced that is integrally bonded to the carrier board 30. This pressing takes place with the effect of heat, for which the aforementioned heating system 16 is used. This heating system 16 can already be switched on before the press element 14 is lowered, or can be switched on only during pressing. In this regard, the application surface 14a is preferably heated to a temperature of between 80° C. and 180° C. The pressing pressure is preferably between 0.5 N/mm$^2$ and 3.5 N/mm$^2$; the closed pressing duration is dependent on the coating material thickness and is preferably between 5 s and 43 s for each mm of coating material thickness.

Figure 7:
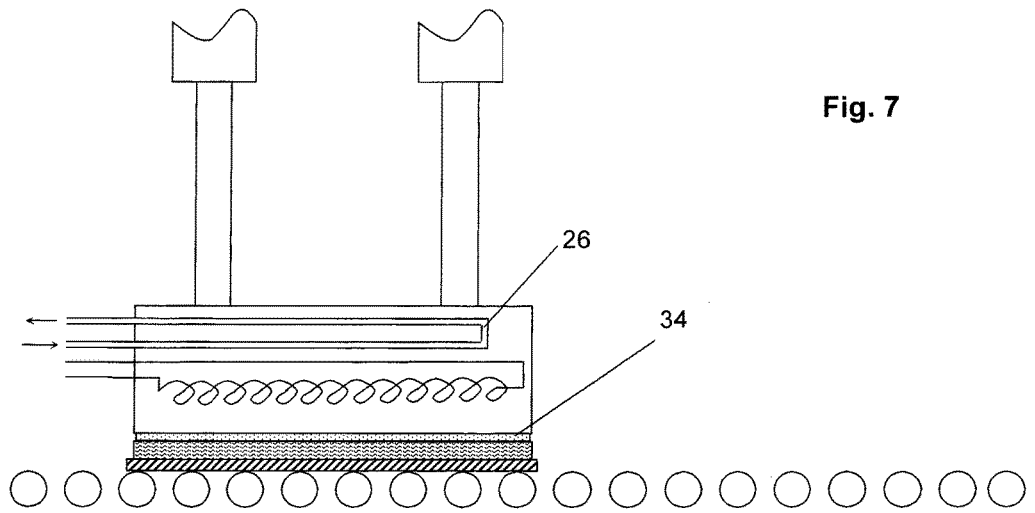

Towards the end of the pressing operation, it is preferable to cool the application surface 14a and thus the planar two-layer board 36 and in this case in particular the WPC layer 34, for which the aforementioned cooling system 26 is used (FIG. 7). It is preferable in this regard for at least the WPC layer 34 to be cooled to a temperature of preferably less than 50° C.

Figure 8:
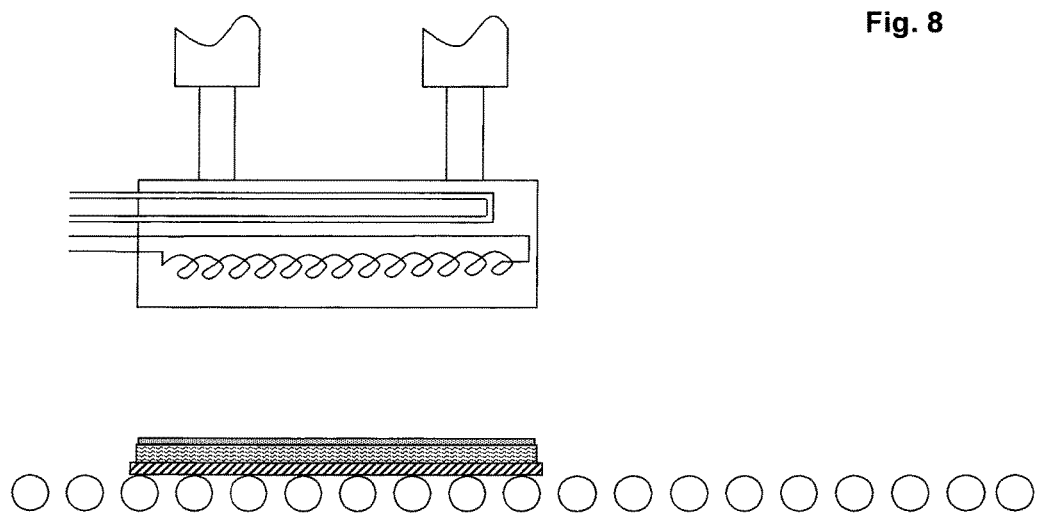
Figure 11:
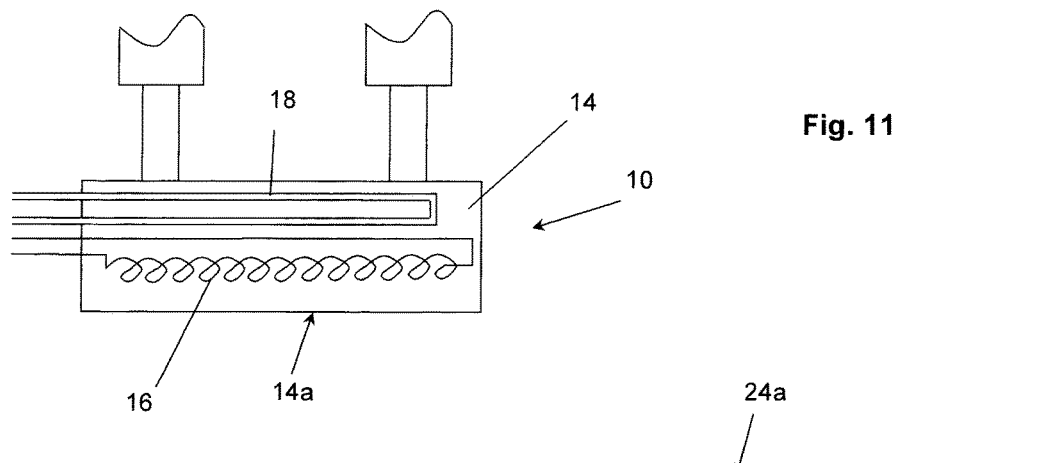
FIG. 11 is a highly schematic view corresponding to that in FIG. 1 of a device for producing a three-layer board according to the invention.

The first press element 14 is now raised, the press plate 20 is removed from the press 10 and the finished two-layer board 35 is lifted off from the press plate 20 (FIGS. 8 to 10). The press plate 20 is then available to be used in a new production cycle.

In particular, the following variants on the described embodiment are possible, though they are not shown in the drawings:

Before the WPC coating material (WPC granular material 32) is applied, an adhesion promoter can be applied to the upward facing surface of the carrier board. This adhesion promoter can be an adhesion promoter as is basically known from WPC production and/or can be an adhesive as used for example in carrier board production.

Alternatively or additionally, it is possible to lay a thermoplastic film between the granular material and carrier board, which film melts when heat is applied during hot-pressing and forms a rigid bond to the carrier board and the granular material.

It is also possible to provide an additional (outer) layer of a thermosetting coating, in particular made of a melamine paper, a phenol paper or the like, on the WPC layer 34. This thermosetting coating can in principle be applied after completion of the two-layer board 35, yet it is also possible for this coating to be applied during the above-described pressing operation. In this case, a corresponding paper or a corresponding film would be placed onto the layer of WPC granular material 32 between the method steps shown in FIGS. 4 and 5.

In a similar method, it is also possible to produce a three-layer board in which the two outer layers consist of WPC material and the middle layer is the carrier board. A method of this type is shown in FIGS. 11 to 21. In this case, a second press element 24 is provided which can be constructed in substantially the same way as the above-described press element 14 (which in this case forms the first press element 14). This second press element 24 replaces the press plate of the first embodiment.

Figure 12:
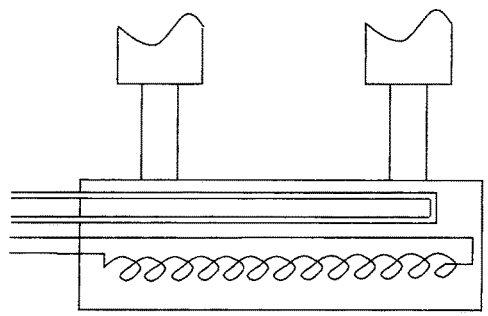
Figure 12:
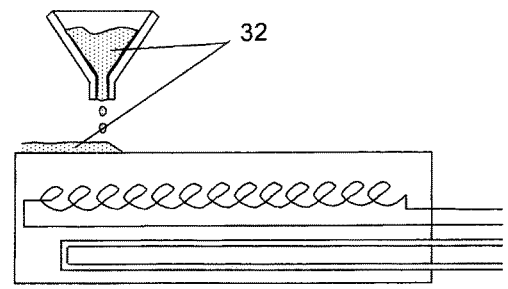
Figure 15:
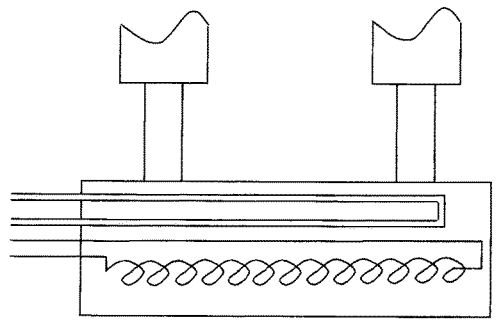
Figure 15:
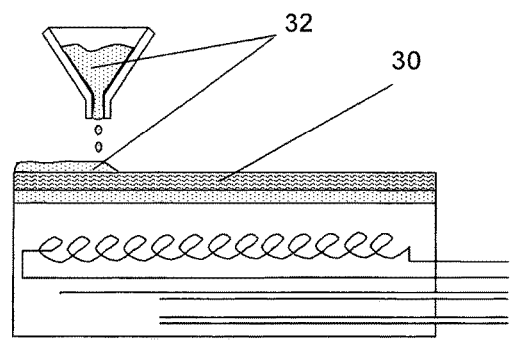
Figure 16:
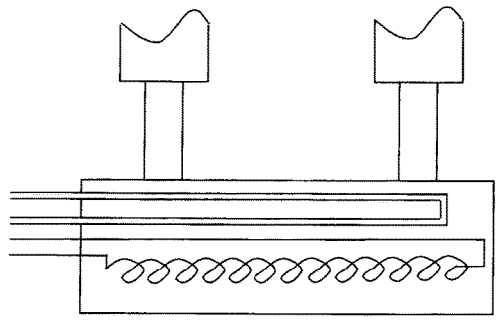
Figure 16:
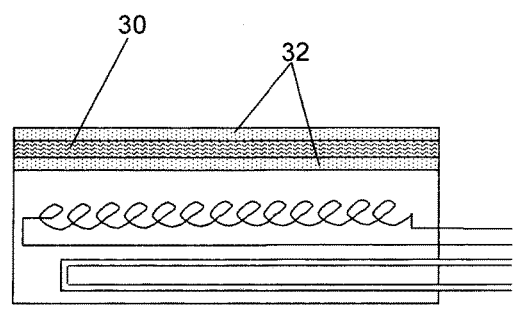
Figure 17:
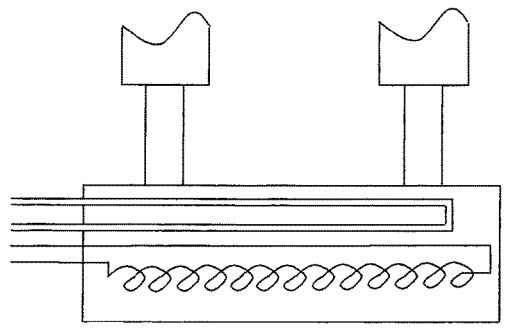
Figure 17:
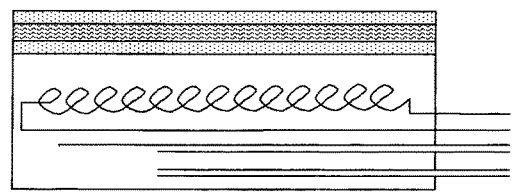
Figure 18:
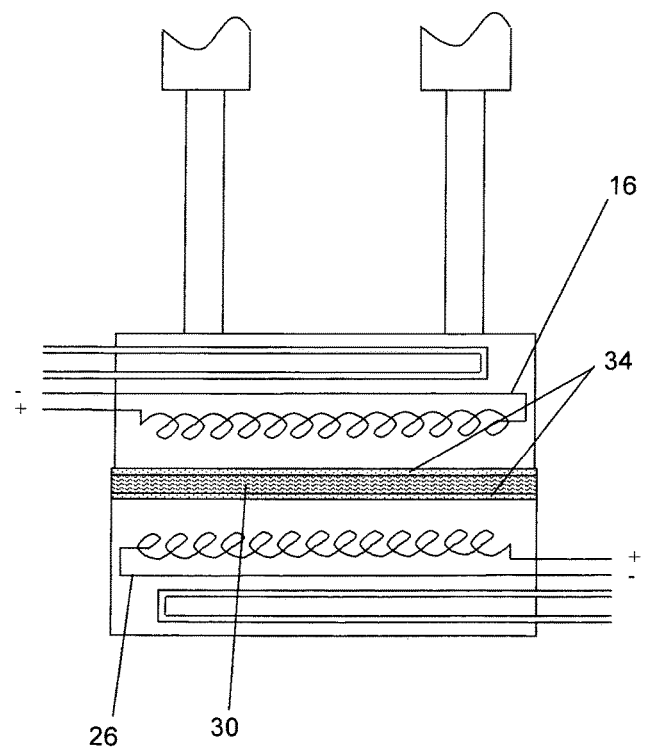

First, WPC material (in the form of WPC granular material 32 in the embodiment shown) is applied to the application surface 24a of the second press element 24 (FIGS. 12 and 13). A carrier board 30 is then placed onto the layer of WPC material (FIG. 14) and then another layer of WPC material, in particular of WPC granular material 32, is applied (FIG. 15). The three layers are now pressed together (FIGS. 17 to 19), it being possible to heat and cool both sides. Once the press elements 14, 24 have been separated (FIG. 20), the three-layer board 36 can be removed (FIG. 21).

The above-described variants in terms of applying an adhesion promoter and/or a thermoplastic film between the carrier board and WPC coatings can also be used accordingly in this case. As described above, it is also possible to additionally coat the WPC coating with a thermosetting coating.

In another embodiment of the method, the WPC coating material is not provided in the form of granular material, but rather in the form of a board of film which is produced in a previous pressing operation and is pressed to the carrier board. In particular, it would also be possible in this case to use a roll press so that the pressing can take place almost continuously.

LIST OF REFERENCE NUMERALS 10 press
12 piston-cylinder unit
14 press element, first press element
14a application surface
16 heating system
18 cooling system
20 press plate
24 second press element
24a application surface
26 heating system
28 cooling system
30 carrier board
32 WPC granular material
34, 34' WPC layer
35 two-layer board
36 three-layer board

The invention claimed is:

1. A method for producing an at least two-layer board for outdoor use, the board comprising a carrier layer comprising wood or lignocellulose-containing particles or fibers, and at least one coating which consists of a wood polymer composite (WPC) material and is arranged on at least one side of the carrier layer, comprising the following steps:
   providing a finished carrier board which is formed of the carrier layer,
   mixing a thermoplastic polymer with lignocellulose-containing particles to form a wood polymer composite (WPC) coating material,
   coating the wood polymer composite (WPC) material on at least one of two surfaces of the carrier board, and
   pressing the wood polymer composite (WPC) coating material and carrier board under the effect of heat and pressure.

2. The method according to claim 1, wherein the lignocellulose-containing particles are chips and/or fibrous materials.

3. The method according to claim 1, wherein a mixture ratio x ($x=m_m/m_p$), based on mass, between a thermoplastic polymer $m_m$ and the lignocellulose-containing particles $m_p$ is x=0.1 to 4.

4. The method according to claim 1, wherein the wood polymer composite (WPC) coating material is wood polymer composite (WPC) granular material or a wood polymer composite (WPC) powder which is strewed onto an upward facing surface of the carrier board.

5. The method according to claim 1, wherein the carrier board is an oriented strand board (OSB), or a solid wood board.

6. The method according to claim 5, wherein the carrier board has a bulk density of less than 500 kg/m$^3$.

7. The method according to claim 1, wherein the carrier board is a multi-layer solid wood board.

8. The method according to claim 1, wherein the carrier board is coated on both sides simultaneously.

9. The method according to claim 1, wherein the pressed board is cooled in the press while the pressure is maintained.

10. The method according to claim 1, wherein an adhesion promoter is applied to the carrier board prior to the application of the wood polymer composite (WPC) coating material.

11. The method according to claim 10, wherein the adhesion promoter consists of an adhesion promoter for the wood polymer composite (WPC) production and/or of an adhesive used during production of the carrier boards.

12. The method according to claim 1, wherein a thermosetting coating made of a melamine paper or a phenol paper is additionally applied to the wood polymer composite (WPC) coating, or in that a liquid coating is applied to the wood polymer composite (WPC) coating.

13. The method according to claim 12, wherein the thermosetting coating is applied together with the wood polymer composite (WPC) coating in one pressing operation.

14. The method according to claim 12, wherein the thermosetting coating is applied after the wood polymer composite (WPC) coating in an additional pressing operation.

15. The method according to claim 1, wherein a thermoplastic film is located between the carrier board and the wood polymer composite (WPC) coating material and is pressed together with the wood polymer composite (WPC) coating material.

16. The method according to claim 1, wherein the wood polymer composite (WPC) coating material consists of a board or film produced in a preceding pressing operation.

17. The method according to claim 1, wherein a mixture ratio x ($x=m_m/m_p$), based on mass, between a thermoplastic polymer $m_m$ and the lignocellulose-containing particles $m_p$ is x=0.5 to 2.

* * * * *